United States Patent
Norton, Jr.

(10) Patent No.: US 6,433,945 B1
(45) Date of Patent: Aug. 13, 2002

(54) COMPENSATING WRITE DATA IN TRANSFORMER-COUPLED RECORDING SYSTEM USING DC CONTENT CODE

(75) Inventor: David E. Norton, Jr., Boulder, CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 09/708,434

(22) Filed: Nov. 9, 2000

Related U.S. Application Data

(60) Provisional application No. 60/218,143, filed on Jul. 14, 2000, and provisional application No. 60/246,724, filed on Nov. 9, 2000.

(51) Int. Cl.[7] .................................................. G11B 5/09
(52) U.S. Cl. .......................... 360/46; 360/51; 360/53; 360/68; 360/65; 360/64
(58) Field of Search .............................. 360/51, 53, 67, 360/68, 65, 46, 64, 25, 26, 45

(56) References Cited

U.S. PATENT DOCUMENTS

| | | | | |
|---|---|---|---|---|
| 4,835,628 A | * | 5/1989 | Hinz et al. | |
| 4,843,495 A | * | 6/1989 | Georgis et al. | |
| 5,065,261 A | * | 11/1991 | Hughes et al. | |
| 5,068,757 A | * | 11/1991 | Hughes et al. | |
| 5,136,436 A | * | 8/1992 | Kahlman | 360/40 |
| 5,142,422 A | * | 8/1992 | Zook et al. | |
| 5,602,694 A | * | 2/1997 | Miles et al. | |
| 5,680,269 A | * | 10/1997 | Georgis et al. | |

OTHER PUBLICATIONS

U.S. Pat. application Ser. No. 09/492,345, filed Jan. 27, 2000, entitled "Power Supply Circuit And Method Of Calibration Therefor".*

* cited by examiner

Primary Examiner—Alan T. Faber
(74) Attorney, Agent, or Firm—Nixon & Vanderhye, P.C.

(57) ABSTRACT

A transformer-coupled tape drive (30) allows operation using a direct current (DC) content code. Usage of the DC content code is facilitated by a compensation circuit (240) which corrects timing distortion caused by the DC content code. The compensation circuit comprises both an emulation circuit (306) and a delay circuit (302). The emulation circuit (306) emulates a high pass filter action of a transformer (220) to provide an emulated high pass filter response signal (WD_HP). The delay circuit (302) modifies the modify timing of the write data signal in accordance with the emulated high pass filter response signal to output a compensated write data signal to the transformer (220).

10 Claims, 9 Drawing Sheets

COMPENSATING WRITE DATA IN TRANSFORMER-COUPLED RECORDING SYSTEM USING DC CONTENT CODE

This application claims the benefit and priority of U.S. Provisional Patent Application Serial No. 60/218,143, filed Jul. 14, 2000, which is incorporated herein by reference in its entirety. The application is related to U.S. Provisional Patent Application Serial No. 60/246,724, filed Nov. 9, 2000, entitled "Phase Based Time Domain Tracking For Helical Scan Tape Drive", which is incorporated herein by reference in its entirety.

BACKGROUND

1. Field of the Invention

The present invention pertains to recording on magnetic tape, and particularly to correcting for distortion in write data timing caused by using a direct current (DC) content code with a transformer-coupled system.

2. Related Art and Other Considerations

In magnetic recording on tape using a magnetic tape drive, relative motion between a head unit (typically with both a write element and a read element) and the tape causes a plurality of tracks of information to be transduced with respect to the tape. The magnetic tape is typically housed in a cartridge which is loaded into the tape drive. The tape extends between a cartridge supply reel and a cartridge take-up reel. The tape drive typically has a supply reel motor for rotating the cartridge supply reel and a take-up reel motor for rotating the cartridge take-up reel.

After the cartridge is loaded into the tape drive, the tape is extracted by mechanisms in the drive so that a segment of the tape is pulled from the cartridge and into a tape path that travels proximate the head unit. The extraction mechanisms take the form of tape guides which are mounted on trolleys. During the extraction operation, trolley motors move the trolleys along a predefined trolley path, so that the tape guides which surmount the trolleys displace the tape into the tape path as the trolleys travel along the trolley path. When the trolleys reach the full extent of travel along the trolley path, the tape is proximate the head unit. Thereafter the tape can be transported past the head unit, e.g., by activation of a capstan and/or the supply reel and take-up reel motors, depending upon the particular type of transport mechanisms employed.

In a helical scan arrangement, as the magnetic tape is transported the magnetic tape is at least partially wrapped around a rotating drum so that heads (both write heads and read heads) positioned on the drum are contiguous to the drum as the drum is rotated. One or more write heads on the drum physically record data on the tape in a series of discrete stripes oriented at an angle with respect to the direction of tape travel. The data is formatted, prior to recording on the tape, to provide sufficient referencing information to enable later recovery during readout by one or more read heads. Examples of helical scan tape drives are shown, inter alia, in the following U.S. patents all of which are incorporated herein by reference): U.S. Pat. No. 4,835,628 to Hinz et al.; U.S. Pat. No. 4,843,495 to Georgis et al.; U.S. Pat. No. 5,065,261 to Hughes et al.; U.S. Pat. No. 5,068,757 to Hughes et al.; U.S. Pat. No. 5,142,422 to Zook et al.; and U.S. Pat. No. 5,602,694 to Miles et al. (which discloses a capstanless helical scan tape drive).

As the tape is transported past the head unit, information can be transduced to or from the tape by the tape drive in recording and reading operations, respectively. In many tape drives, the data to be written or recorded on tape is applied to a write head of the head unit through a transformer having a high pass element.

When the recording and/or reading operations are concluded, and before the cartridge can be unloaded from the drive, the tape must be retracted for return to the interior of the cartridge. Tape retraction is essentially the reverse of the tape extraction procedure described above.

In recording information on magnetic tape, various mathematical codes can be employed for error detection and/or error correcting purposes. The recording process is inductive in nature, and if the code used to record the information does not supply a run length constraint then the data may become unreadable. This is because no clock signal is recorded; rather the clock is reconstructed out of the recorded data. This implies that if no transitions are present then there is nothing to use to reproduce the clock, hence the need for a run length constraint.

In a helical scan recorder some means of coupling to the heads on the rotating drum is required. This coupling often takes the form of a rotary transformer. Typically the rotary transformer creates a high pass response in the write data path. Traditionally the problem of high pass response has been corrected by use of a DC free code, as DC information cannot be passed through the transformer. The use of a DC free code is not without it's problems, however. In order to achieve a DC free code, constraints are applied to the code that limit it's density, increasing the overhead associated with using the code. This implies that if a method is discovered to write a DC content code on an AC coupled write path then a higher effective density can be achieved (~15%).

FIG. 12A and FIG. 12B illustrate problems attending the use of a DC code in a transformer-coupled tape drive system. FIG. 12A shows a worst case write waveform before the transformer; FIG. 12B shows the write waveform after the transformer. The waveforms shown in FIG. 12A and FIG. 12B are for both passive and active systems, the difference is that the waveforms represent a current waveform in the passive case, and both waveforms represent a voltage waveform for the active case. For the passive case, FIG. 12A shows the current in the transformer primary and FIG. 12B shows the current in the secondary and head. For the active case, FIG. 12A shows the voltage on the transformer primary and FIG. 12B shows the voltage on the transformer secondary, as well as being the voltage input to the write driver. As used herein, a "passive" system has only a write head on the rotating side of the transformer, and that the waveform is the write current through the head. An active system, on the other hand, includes a write current driver to drive the write head, and the waveform is the voltage present to the input of the write current driver. It is incidental that power on the rotor (POR) is included, the POR enables incorporation of write drivers on the rotating side of the transformer.

As shown in FIG. 12A and FIG. 12B, the result of the transformer in this case is to modify the times such that T1 has increased, and T2 has decreased. The dotted line across each of the two waveforms is the zero (switching threshold) point. Note that the action of the high pass of the transformer is to make of the area on each side of the zero line equal. This characteristic is the problem with writing a DC content code: if the system is passive then the write current in each direction becomes a function of the code's DC content. In this example much more current is being used to write in the upward direction than the down going direction. This difference is high enough that the head may be saturated in the up going direction, and may not be able to overwrite the old data in the downward one.

A slow write waveform rise time is employed in FIG. 12A and FIG. 12B in order to better illustrate a further problem. In FIG. 12A and FIG. 12B the zero crossings have moved out from the center of the narrow pulses, resulting in a "pulse pairing". This movement is on the order of 0.7 nsec worst case using a 16/17 code. This is almost 10% of the window, which is enough error to prevent the tape drive from being able to read data recorded with the DC code.

It might be proposed to drive the transformer in such a fashion that the DC offset never builds up on it's output. Integrating the DC offset into the transformer using the code's DC content conceivably could accomplish this. However, as the maximum DC content of the code is not constrained there is also no constraint on the drive level. Therefore, this proposal is not realizable.

What is needed, therefore, and an object of the invention, is a transformer-coupled tape drive system which uses a DC code.

BRIEF SUMMARY OF THE INVENTION

A transformer-coupled tape drive operates using a direct current (DC) content code. Usage of the DC content code is facilitated by a compensation circuit which corrects timing distortion caused by the DC content code. An advantage of allowing DC content is that the maximum amount of data that can be recorded is increased for a given head/tape combination.

In the tape drive of the present invention, an encoding unit encodes data to be recorded with a direct current (DC) content code, and generates a write data signal for DC-code encoded data. The write data signal is applied to a compensation circuit of the present invention, which outputs a compensated write data signal (which is corrected for the distortion caused by the DC content code). The compensated write data signal is then applied to a high pass transformer, which outputs a transformed write data signal. A write head on a rotating scanner or drum records information on the magnetic tape in accordance with the transformed write data signal.

The compensation circuit comprises both an emulation circuit and a delay circuit. The emulation circuit emulates the high pass filter action of the transformer to provide an emulated high pass filter response signal. The delay circuit modifies the timing of the write data signal in accordance with the emulated high pass filter response signal to output the compensated write data signal. That is, the delay circuit modifies the positions of the zero crossings of the write data signal in such a fashion that the zero crossings are in the correct position after the transformer.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
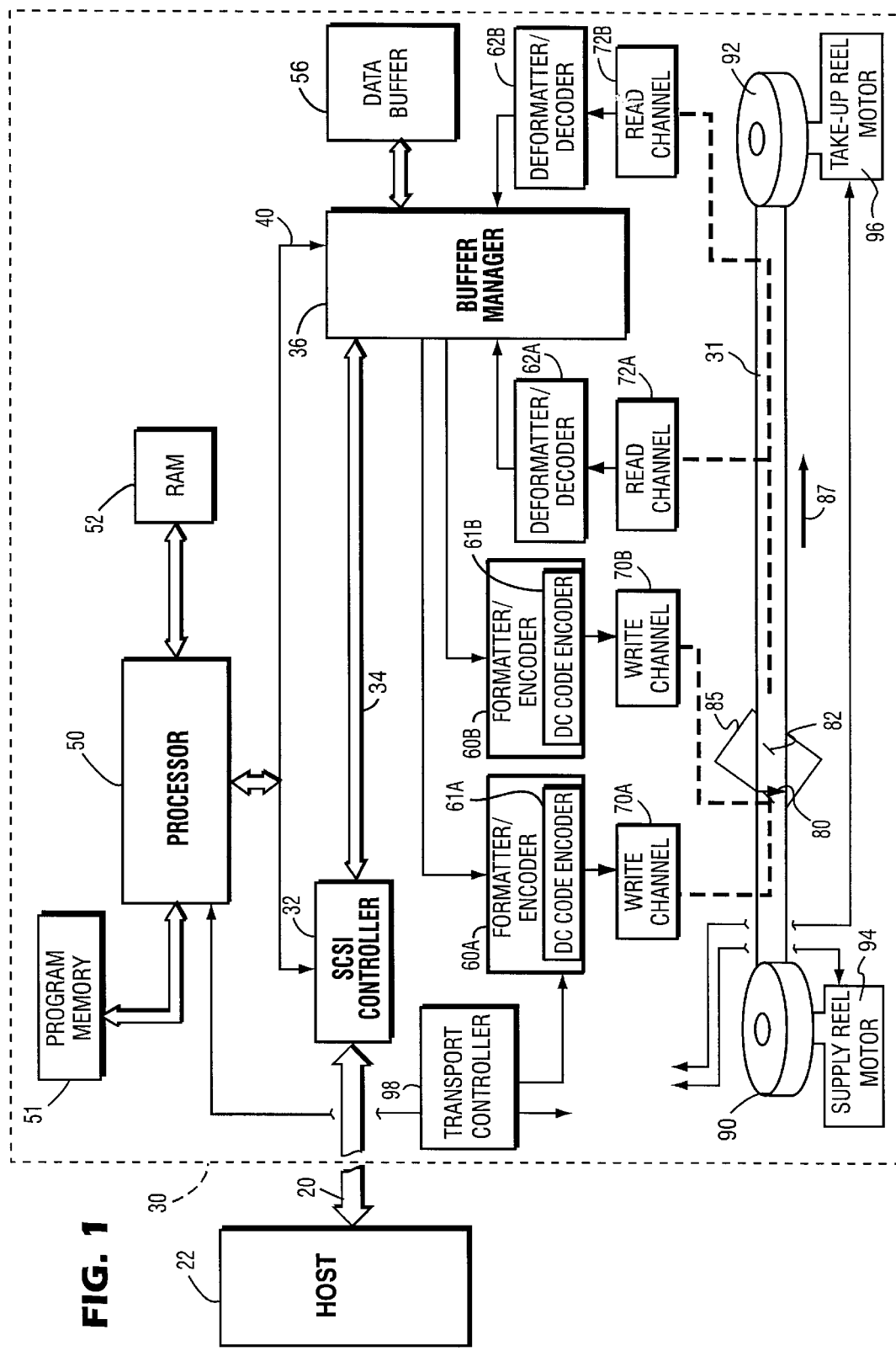
FIG. 1 is a schematic view of an example tape drive according to one embodiment of the present invention, the tape drive being connected to a host.

FIG. 1 shows a SCSI bus 20 which connects a host computer 22 and a first embodiment of a SCSI target storage device, particularly tape drive 30. In the illustrated embodiment, an example tape drive 30 is shown as a generic helical scan tape drive which transduces information on/from tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to one or more formatter(s)/encoder(s) 60 and to one or more deformatter(s)/decoder(s) 62. In the particular illustrated example embodiment, two formatter/ encoders 60A and 60B and deformatter/decoders 62A and 62B are provided. Formatter/encoders 60 and deformatter/ decoders 62 are, in turn, respectively connected to write channels 70 and read channels 72. In particular, formatter/ encoder 60A and formatter/encoder 60B are respectively connected to write channel 70A and write channel 70B, respectively, while deformatter/decoder 62A and deformatter/decoder 62B are connected to read channel 72A and read channel 72B, respectively. Each write channel 70 is connected to one or more recording element(s) or write head(s) 80; each read channel is connected to one or more read element(s) or read head(s) 82. The write head(s) 80 and the read head(s) 82 are mounted on a rotatable drum or scanner 85. In the illustrated embodiment, each of the channels 70A, 70B, 72A, and 72B are connected to two heads, the connection between the two heads being switched with respect to each channel in accordance with rotational position of scanner 85.

As shown in FIG. 1, each formatter/encoder 60 includes DC code encoding unit 61. In other words, formatter/ encoder 60A and formatter/encoder 60B respectively include DC code encoding unit 61A and DC code encoding unit 61B. In one example embodiment, the DC code utilized by 61 is of 0,3 run length. The output of encoding unit 61 (e.g., the DC-code encoded data) is referred to herein as a write data signal.

Those skilled in the art will appreciate that each write channel 70 includes various circuits and elements including a RLL modulator, a parallel-to-serial converter, and write current modulator. Similarly, the person skilled in the art understands that each read channel 72 includes a data pattern and clock recovery circuitry, a serial-to-parallel converter, and, an RLL demodulator. These and other aspects of tape drive 30, including servoing, error correction, are not necessary for an understanding of the invention and accordingly are not specifically described herein.

Write head(s) 80 and read head(s) 82 are situated on a peripheral surface of rotating drum or scanner 85. Tape 31 is wrapped around scanner 85 such that head(s) 80 and 82 follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around scanner 85.

A supply reel 90 and take-up reel 92 are driven by respective reel motors 94 and 96 to transport tape 31 in the direction 87. Reel motors 94 and 96 are driven by transport controller 98, which ultimately is governed by processor 50. Operation and control of the tape transport mechanism of this second type of tape drive including reel motors 94 and 96 is understood by the person skilled in the art with reference, for example, to U.S. Pat. No. 5,680,269 and incorporated herein by reference.

Figure 8:
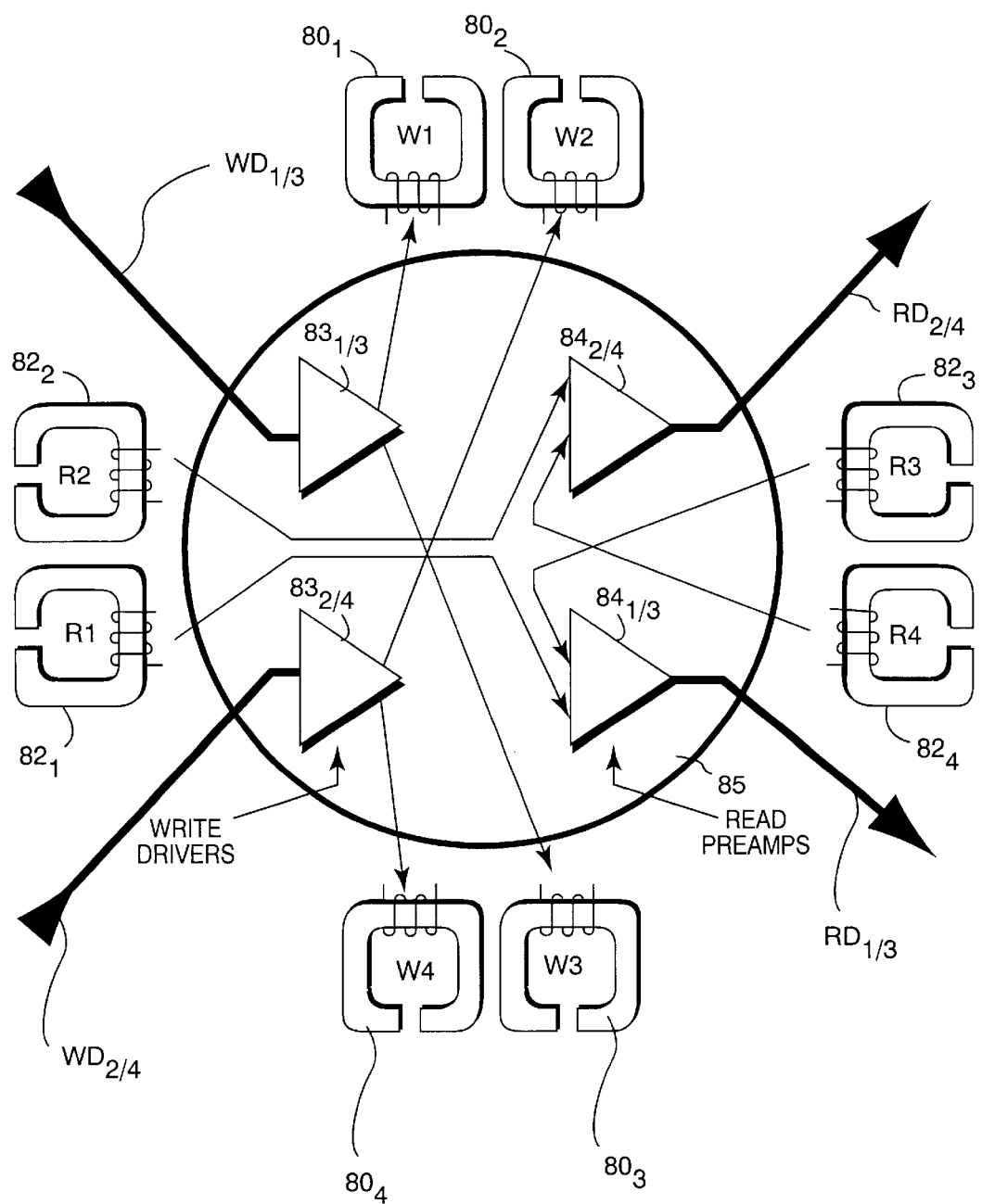
FIG. 8 is a schematic view of an example scanner, showing write and read heads as well as certain scanner-mounted electronics.

In one example embodiment, four write heads and four read heads are mounted on the drum 85, with each channel being switchably connected to two heads. FIG. 8 schematically illustrates drum 85, also known as a scanner, which has four write heads $80_1$–$80_4$ and four read heads $82_1$–$82_4$ mounted on its periphery. FIG. 8 does not show the four write heads $80_1$–$80_4$ and four read heads $82_1$–$82_4$ as being precisely mounted, but rather arranged about the drum 85 in a general pattern of head placement. It should be understood, however, that the four write heads $80_1$–$80_4$ and four read heads $82_1$–$82_4$ are, in fact, mounted on the periphery of scanner 85 for transducing information relative to tape 31. The present invention is not limited by such factors as, for example, the number of heads employed.

In addition to write heads 80 and read heads 82, scanner 85 also has,certain electronics mounted thereon. The scanner-mounted electronics include write drivers $83_{1/3}$ and $83_{2/4}$, as well as read preamplifiers $82_{1/3}$ and $82_{2/4}$. Write data signals are applied on lines shown generally as $WD_{1/3}$ and $WD_{2/4}$ in FIG. 8 to write drivers $83_{1/3}$ and $83_{2/4}$, respectively. As the subscripts indicate, the write data carried by line $WD_{1/3}$ is applied to write driver $83_{1/3}$, which supplies a write data signal to write heads $80_1$ and $80_3$. The write data carried by line $WD_{2/4}$ is applied to write driver $83_{2/4}$, which supplies a write data signal to write heads $80_2$ and $80_4$. Because the tape is only wrapped 180 degrees around the scanner 85, only one of the two write heads on each write driver is in contact with the tape at a time. In other words, during a first portion of the revolution of scanner 85, the write head 801 is connected to write driver $83_{1/3}$, while during a second portion of the revolution of scanner 85, the write head $80_3$ is connected to write driver $83_{1/3}$. Similarly, during a first portion of the revolution of scanner 85, the write head $80_2$ is connected to write driver $83_{2/4}$, while during a second portion of the revolution of scanner 85, the write head $80_4$ is connected to write driver $83_{2/4}$. So the separation of the data on the two heads is in time, and the same data lines may be used to couple the write data into the scanner. An unillustrated control element switches the heads at the appropriate time dependent on scanner position.

In converse fashion, the data transduced by read heads $82_1$ and $82_3$ are applied to read preamplifier $84_{1/3}$, while the data transduced by read heads $82_2$ and $82_4$ are applied to read preamplifier $84_{2/4}$. The outputs from read preamplifier $84_{1/3}$ and read preamplifier $84_{2/4}$ are transmitted from scanner 85 as read data signals on lines shown generally as $RD_{1/3}$ and $RD_{2/4}$, respectively, in FIG. 8. During a first portion of the revolution of scanner 85, the read head $82_1$ is connected to read preamplifier $84_{1/3}$, while during a second portion of the revolution of scanner 85, the read head $82_3$ is connected to read preamplifier $84_{1/3}$. Similarly, during a first portion of the revolution of scanner 85, the read head $82_2$ is connected to read preamplifier $84_{2/4}$, while during a second portion of the revolution of scanner 85, the read head $82_4$ is connected to read preamplifier $84_{2/4}$.

In addition to the electronics illustrated in FIG. 8, other electronics are provided on scanner 85. Included in the unillustrated electronics is the supply of voltage to 85, which is understood with reference to U.S. patent application Ser. No. 09/492,345, filed Jan. 27, 2000, entitled "Power Supply Circuit And Method Of Calibration Therefor", which is incorporated herein by reference in its entirety.

The mounting of write drivers, such as write drivers $83_{1/3}$ and $83_{2/4}$, on scanner 85 between the transformer and the write heads allows the tape drive system of the present invention to use a DC code, provided that certain compensations are provided. Those compensations, implemented by the circuitry shown in FIG. 2 and explained in detail hereinafter, correct for distortion in the write data timing caused by using the DC content code in the transformer-coupled system.

Figure 2:
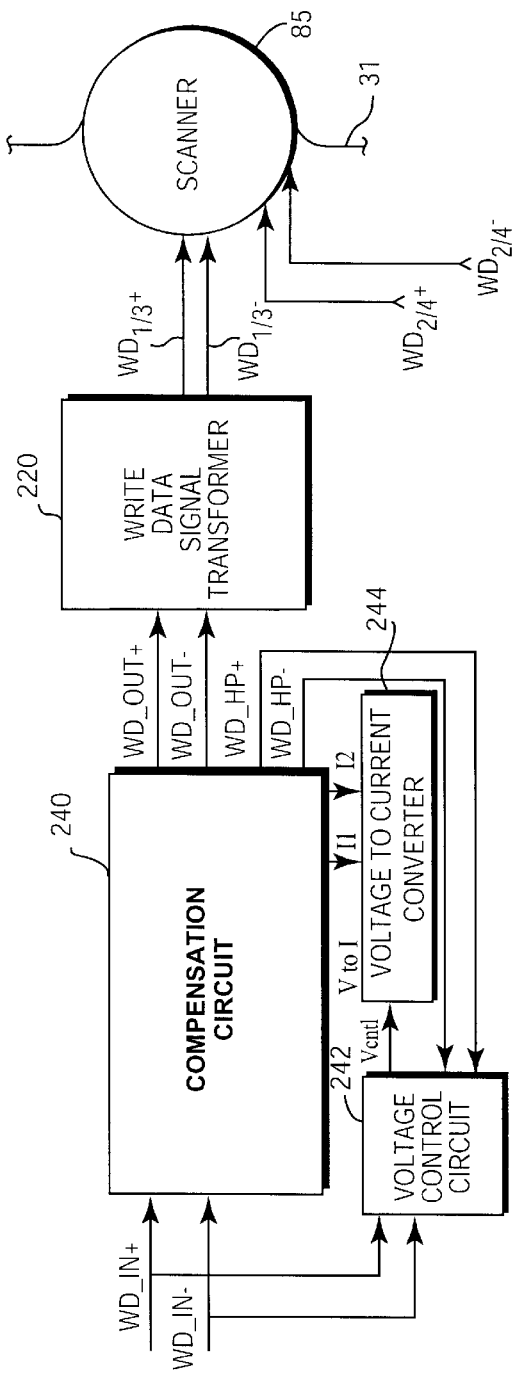
FIG. 2 is a schematic view of a portion of the tape drive of FIG. 1, particularly including selected elements of the tape drive upstream from write heads, including a write signal compensation circuit.

FIG. 2 shows, in more detail, how a data write signal is applied from one of the write channels 70 to one or more recording element(s) or write head(s) 80 on scanner 85. FIG. 2 shows the write data signal $WD_{1/3}$ which carries data for the write heads 80 and 80₃ as coming from transformer 220. The write data signal WD is herein also referred to as the transformed write data signal, since it is output by transformer 220. Transformer 220 is in turn is fed by a compensation circuit 240. FIG. 2 also shows the write data signal $WD_{2/4}$ which carries data for the write heads 80₂ and 80₄. For sake of simplicity, a comparable transformer 220 and compensation circuit 240 for the write data signal $WD_{2/4}$ are omitted from FIG. 2, the presence and operation thereof being understood with reference to the example illustrated for the write data signal $WD_{1/3}$.

A significant aspect of the present invention is compensation circuit 240, which is described below in more detail with reference to FIG. 3, for example. It is from the perspective of compensation circuit 240 that names are applied for the various stages of the write data signal which is to be written on the medium. That is, it is the DC-code encoded write data signal output from write channel 70 to compensation circuit 240 that is considered as the WD_IN+ and WD_IN− signals in FIG. 2 (e.g., "IN" to compensation circuit 240). Similarly, the WD_OUT+ and WD_OUT− write data signals, also referred to herein as the compensated write data signal, are output from compensation circuit 240 to transformer 220 (e.g., "OUT" from compensation circuit 240).

FIG. 2 also shows that compensation circuit 240 works in conjunction with voltage control circuit 242 and a voltage-to-current converter 244. The voltage control circuit 242 also receives the WD_IN+ and WD_IN− signals, as well as WD_HP+ and WD_HP− signals which are output from compensation circuit 240. As explained in more detail with reference to FIG. 4, the voltage control circuit 242 outputs a voltage control signal Vcntl to voltage-to-current converter 244 (described subsequently with respect to FIG. 5). The voltage-to-current converter 244 applies current signals I1 and I2 to compensation circuit 240.

Figure 3:
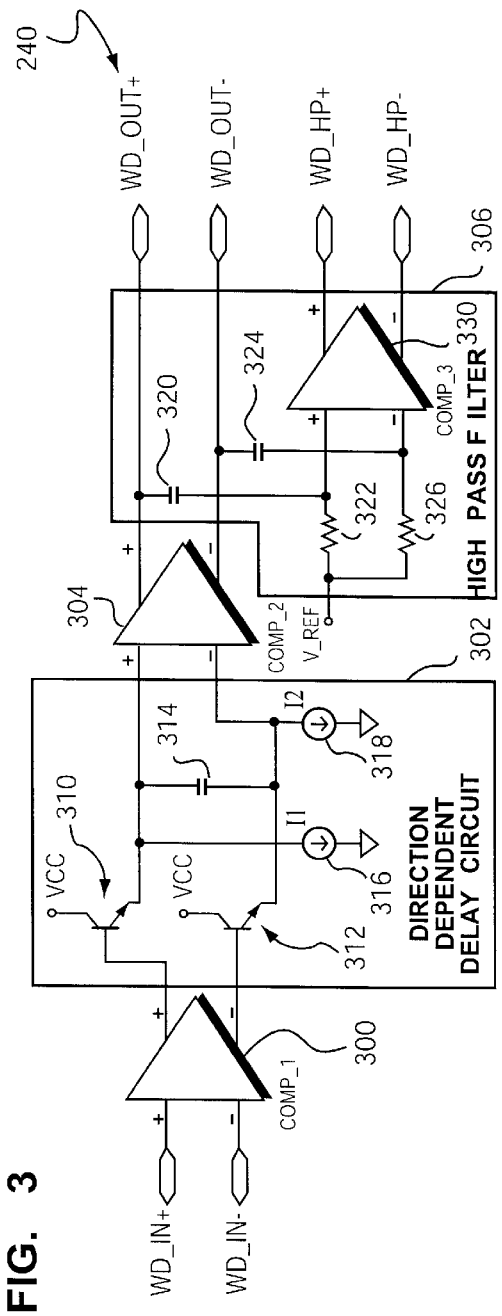
FIG. 3 is a schematic view of an example compensation circuit according to an embodiment of the present invention.

FIG. 3 shows an example configuration of compensation circuit 240 according to one embodiment of the present invention. As explained below, compensation circuit 240 models the high pass function of transformer 220 using a simple RC high pass filter. In general, compensation circuit 240 comprises comparator 300; delay circuit 302; comparator 304; and, an emulation circuit which is also known as high pass filter 306. The delay circuit 302 is also referred to as the "direction dependent delay (DDD) circuit".

The delay circuit modifies the positions of the zero crossings of the write data signal (see FIG. 12A and FIG. 12B) in such a fashion that the zero crossings are in the correct position after transformer 220. The delay circuit 302 includes transistors 310, 312 connected as emitter followers. In particular, the base of transistor 310 is connected to the non-inverting output of comparator 300; the base of transistor 312 is connected to the inverting output of comparator 300. The collectors of transistor 310 and transistor 312 are both connected to +VCC. The emitter of transistor 310 is connected to the non-inverting input of comparator 304; the emitter of transistor 312 is connected to the inverting input of comparator 304. A timing capacitor 314 is connected between the emitters of transistor 310 and transistor 312. A current source 316 supplying current I1 is connected between the emitter of transistor 310 and voltage-to-current converter 244 (see FIG. 2); a current source 318 supplying current I2 is connected between the emitter of transistor 312 and voltage-to-current converter 244.

The comparator 304 is employed both to drive transformer 220 and to drive the emulation circuit which is referred to also as the high pass filter 306. The high pass filter 306 includes: (1) a high pass filter comprising capacitor 320 and resistor 322 connected between the non-inverting output of comparator 304 and a reference signal V_REF; (2) a high pass filter comprising capacitor 324 and resistor 326 connected between the inverting output of comparator 304 and the reference signal V_REF; and (3) comparator 330. A signal from between the series connection of capacitor 320 and resistor 322 is applied to the non-inverting input of comparator 330; a signal from between the series connection of capacitor 324 and resistor 326 is applied to the inverting input of comparator 330. The non-inverting output of comparator 330 is the signal WD_HP+; the inverting output of comparator 330 is the signal WD_HP−, both of which are applied to voltage control circuit 242 as shown in FIG. 2 and are collectively referred to herein as the emulated high pass filter response signal.

Figure 4:
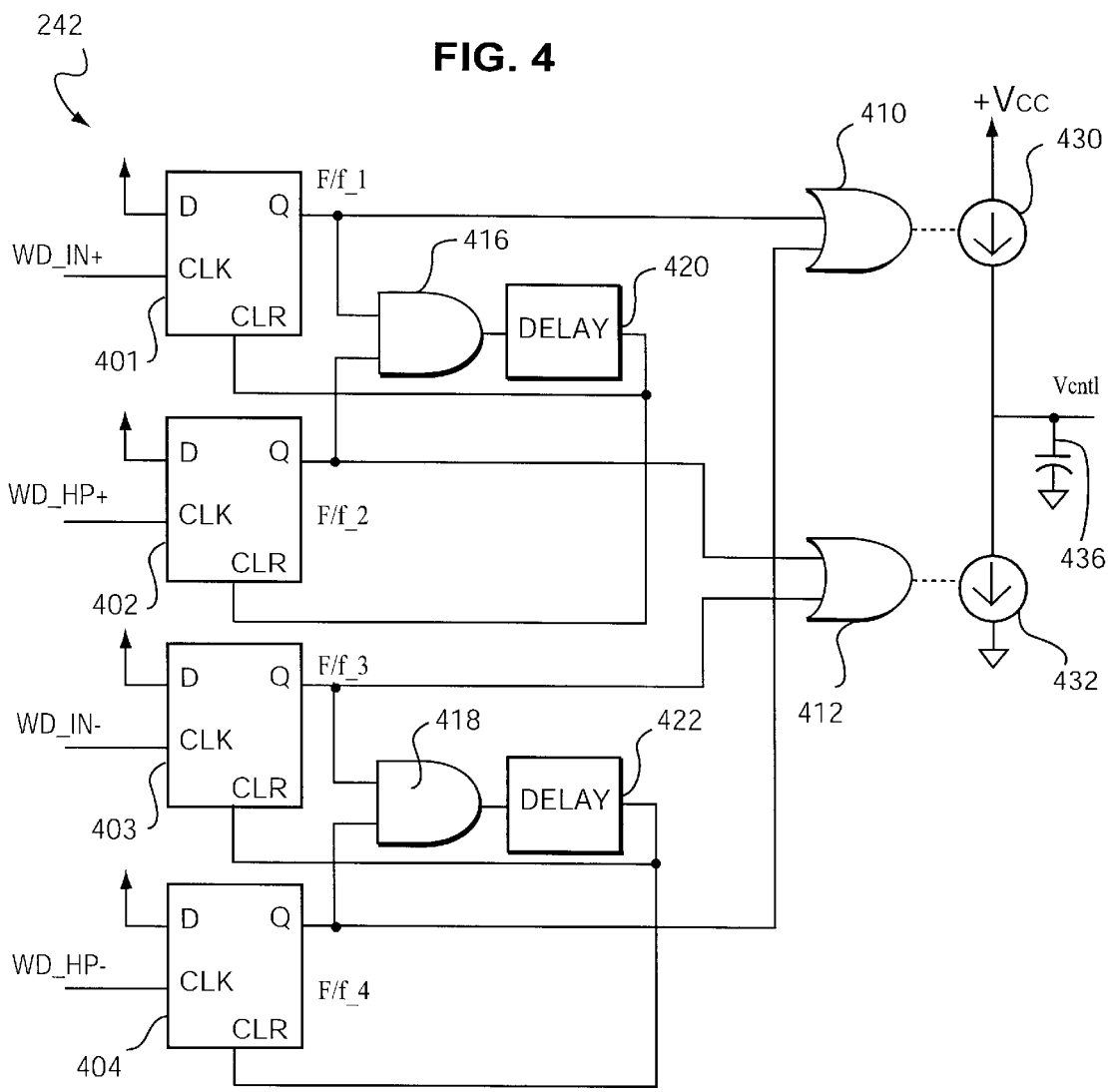
FIG. 4 is a schematic view of an example voltage control circuit utilized with a compensation circuit shown in FIG. 2 in accordance with an embodiment of the invention.

FIG. 4 shows, in more detail, an example embodiment of the voltage control circuit 242 (see FIG. 2). The voltage control circuit 242 has four multistable vibrator elements, e.g., flip-flops 401–404. The D input pins of flip-flops 401–404 are each connected to high (e.g., logical one). The CLK input pin of flip-flop 401 receives the signal WD_IN+; the CLK input pin of flip-flop 402 receives the signal WD_HP−; the CLK input pin of flip-flop 403 receives the signal WD_IN−; the CLK input pin of flip-flop 404 receives the signal WD_HP−. The Q output pins of flip-flop 401 and flip-flop 404 are connected to respective first and second input pins of OR gate 410. Similarly, the Q output pins of flip-flop 402 and flip-flop 403 are connected to respective first and second input pins of OR gate 412. The Q output pins of flip-flop 401 and flip-flop 402 are also connected to respective first and second input pins of AND gate 416. In similar manner, the Q output pins of flip-flop 403 and flip-flop 404 are also connected to respective first and second input pins of AND gate 418. The output pin of gate 416 is connected to an input of delay element 420; the output pin of gate 418 is connected to an input of delay element 422. The output from delay element 420 is applied to the CLR pins of flip-flop 401 and flip-flop 402; the output from delay element 422 is applied to the CLR pins of flip-flop 403 and flip-flop 404.

The output of gate 410 is applied to current source 430; the output of gate 412 is applied to current source 432. The current source 430 and current source 432 are connected in series between the positive power supply +VCC 434 and ground. The control voltage Vcntl is taken between the series connection of element 430 and 432, and is also connected via capacitor 436 to ground.

Current sources 430 and 432 in combination with capacitor 436 on Vcntl form an integrator, which is used to set the bandwidth of the control loop. In some of the later FIGS. (FIG. 11A, B) the value of the current on these two current sources is what is being referred to as pump, and is what is being varied to vary the bandwidth of the compensation circuit.

Figure 5:
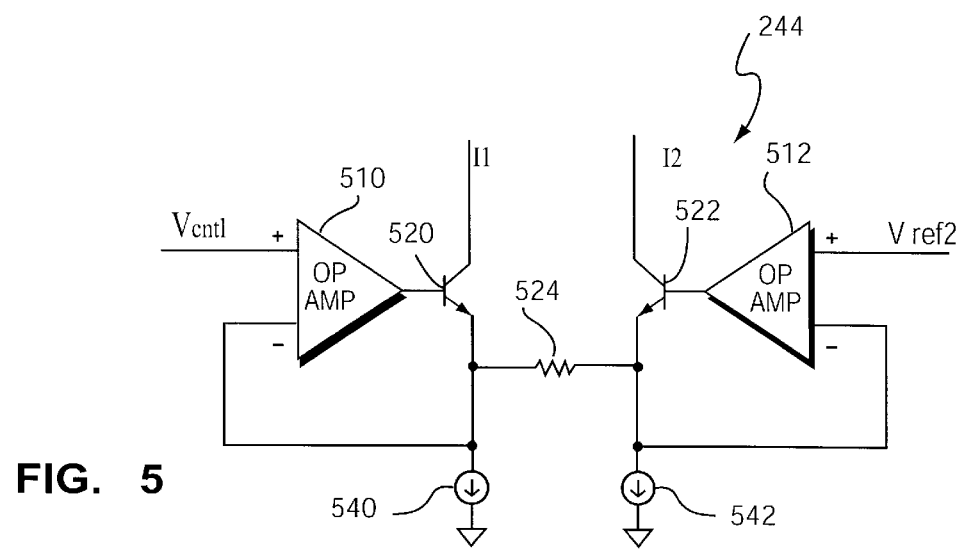
FIG. 5 is a schematic view of an example voltage-to-current converter utilized, in accordance with an embodiment of the invention, with a compensation circuit shown in FIG. 2 and the voltage control circuit shown in FIG. 4.

The control voltage Vcntl is applied to voltage-to-current converter 244, which is shown in more detail in FIG. 5. In particular, the control voltage Vcntl is applied to non-inverting terminals of operation amplifier 510. The voltage Vref2 is applied to the non-inverting terminal of operation amplifier 512. The output of operation amplifier 510 is applied to the gate of transistor 520; the output of operation amplifier 512 is applied to the gate of transistor 522. The emitter of operation amplifier 510 and operation amplifier 512 are connected together by resistor 524. In addition, the emitter of transistor 520 is connected to the inverting terminal of operation amplifier 510, as well as through current source 540 to ground. In similar manner, the emitter of transistor 522 is connected to the inverting terminal of operation amplifier 520, as well as through current source 542 to ground.

Current source 316 is the sum of two components, current source 540 plus the current through resistor 524. If there is no difference between Vcntl and Vref, then there is no current in resistor 524 and current source 316 is equal to current source 540. Likewise current source 318 is the sum of current source 542 and again the current in resistor 524. Again if there is no difference, current source 318 will equal current source 542. Also, nominally current source 540 is equal to current source 542. The way this circuit works is if Vcntl rises above Vref, then a current is generated in current source 524, and I1 will rise with I2 falling by an equal amount. Likewise if Vcntl is lower than Vref, I11 will fall, with I2 rising the same amount. The effect is that op amp 510, transistor 520, current source 540, and half of resistor 524 are used to create the function of current source 316, and likewise op amp 512, transistor 522, current source 542, and again half of resistor 524 are used to create the function of current source 318.

In operation, the compensation circuit 240 of FIG. 3, comparator 300 is used to square up the write data signal (e.g., WD_IN+ and WD_IN−) and drive the emitter followers (e.g., transistor 310 and transistor 312). The emitter followers (e.g., transistor 310 and transistor 312) are part of direction dependent delay (DDD) circuit 302, which, as mentioned above, is comprised of transistor 310 and transistor 312, current source 316, current source 318, and timing capacitor 314. Comparator 304 is used to square the signal up again, and drive transformer 220. The comparator 304 also drives the high pass filter 306. The high pass filter 306 is used to model the response of transformer 220. Where the sum of I1 (from current source 316) and I2 (from current source 318) is a constant, this constant is the sum of current source 540 and current source 542 which is adjusted using a calibration function. The implication of the sum of the currents I1 and I2 being a constant is that, as one of them is increased, the second will decrease.

Figure 6A:
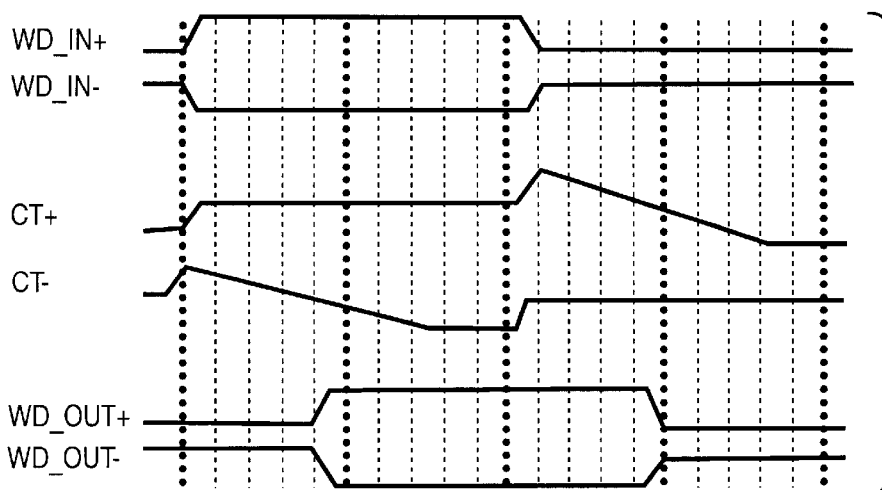
FIG. 6A–FIG. 6C are graphical views showing various waveforms in accordance with three differing scenarios having differing relationships of the magnitudes of current I1 current and I2.
Figure 6B:
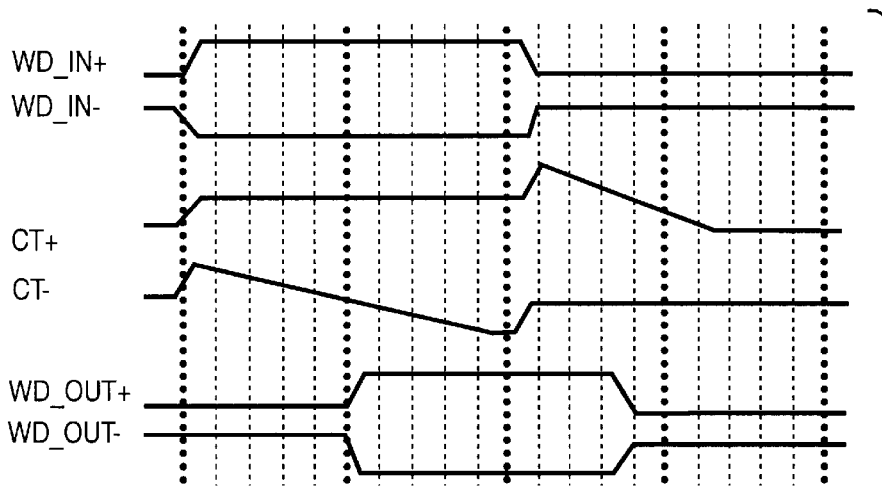
Figure 6C:
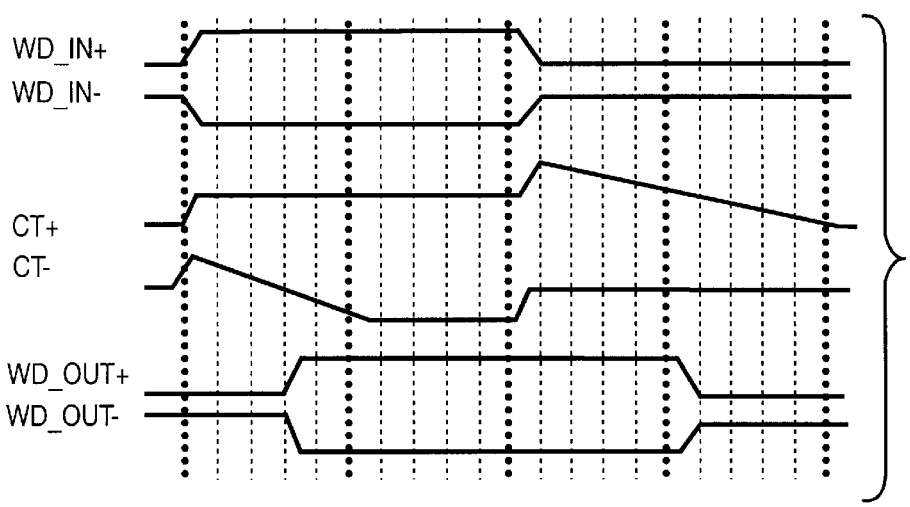

In essence, the delay circuit 302 modifies the timing of the write data signal (WD_IN) in accordance with the emulated high pass filter response signal (WD_HP) in order to output the compensated write data signal (WD_OUT). The operation of the direction dependent delay (DDD) circuit 302 is described with reference to FIG. 6A–FIG. 6C. FIG. 6A–FIG. 6C are graphs showing various waveforms in accordance with three differing scenarios having differing relationships of the magnitudes of current I1 and current I2. In FIG. 6A–FIG. 6C, the notation "CT+" represents the top terminal of timing capacitor 314 while the notation "CT−" represents the lower terminal of timing capacitor 314. The horizontal axis for each of FIG. 6A–FIG. 6C is time.

FIG. 6A shows direction dependent delay circuit 302 in a scenario in which I1 I2. In the scenario of FIG. 6A, direction dependent delay circuit 302 serves as a simple delay element. In this regard, note the delayed time of the leading edge of the pulse for WD_OUT+ (or the pulse for WD_OUT−) relative to the leading edge of the pulse for WD_IN+ (or the pulse for WD_IN−), and also the delayed time of the falling edge of the pulse for WD_OUT+ (or the pulse for WD_OUT−) relative to the falling edge of the pulse for WD_IN+ (or the pulse for WD_IN−).

In the scenario of FIG. 6B, the magnitude of current I1 is greater than the magnitude of current I2 (i.e., I1>I2). In this scenario, note that the first transition (e.g., leading edge) of the pulse for WD_OUT+ (or the pulse for WD_OUT−) has been delayed two time units relative to the scenario of FIG. 6A. In addition, the second transition (e.g., trailing edge) of the pulse for WD_OUT+ (or the pulse for WD_OUT−) has been advanced two time units relative to the scenario of FIG. 6A.

The scenario of FIG. 6C is the reverse of the scenario of FIG. 6B, and is the situation in which the magnitude of current I1 is less than the magnitude of current I2 (i.e., I1<I2). In FIG. 6C, the first transition has been advanced one unit earlier than for FIG. 6A, while the second transition has been delayed one unit later than for FIG. 6A.

The scenarios depicted in FIG. 6A–FIG. 6C illustrate an interesting characteristic: the voltage on the terminals of timing capacitor 314 (shown by waveforms CT+ and CT−) goes above the rest value during the transition. This is illustrated by a low to high transition of signal WD_OUT+ (or the high to low transition of signal WD_OUT−). This transition occurs because the emitters of transistor 310 and transistor 312 are tied together with the timing capacitor 314. When the low to high transition occurs in the write data signal as output from comparator circuit 300, a voltage equal to the switching voltage is stored across timing capacitor 314. The switching voltage is the difference between the low and high level output of comparator 300. When the circuit 302 switches, this stored voltage forces the output that is nominally going down to a level above it's previous output, turning off the drive transistor, e.g., transistor 310. The only discharge path is the timing current (I1, I2), so the voltage decays at a rate set by the timing current and timing capacitor 314. When this voltage passes the high level present on the other output of comparator 304, comparator 304 switches state. Thus, as illustrated in and understood from FIG. 6A–FIG. 6C, direction dependent delay circuit 302 performs the function of a direction dependent delay.

The high pass filter 306 provides a response similar to the high pass characteristics of transformer 220. The comparator 330 generates high pass output signals WD_HP+ and WD_HP−, shown in FIG. 3 as being output from comparator 330. These high pass output signals WD_HP+ and WD_HP− are then compared by voltage control circuit 242 (see FIG. 2 and FIG. 4) with the original input waveform, i.e., WD_IN+ and WD_IN−, respectively. As a result of the comparison performed by voltage control circuit 242, a compensation value (control voltage Vcntl) is generated which controls the ratio of current I1 to current I2.

The voltage control circuit 242 generates the control voltage signal Vcntl from the input data (WD_IN+ and WD_IN−) and the compensated, high pass data (WD_HP+ and WD_HP−). The voltage control circuit 242 operates much the same as the charge pump on a PLL. WD_IN+ is compared with WD_HP+, and WD_IN− is compared to WD_HP−. Therefore, two separate circuits are required. The topology of the voltage control circuit 242 eases the timing requirements on the delay for the nominal versus compensated delay paths, as two bit cells of delay can be tolerated before cycle slip occurs.

The operation of voltage control circuit 242 is now summarized. If WD_IN+ arrives before WD_HP+, flip-flop 401 will be set, turning on the charge up current into Vcntl. When WD_HP+ arrives, flip-flop 402 will be set, which though delay element 420 will clear both flip-flop 401 and flip-flop 402. There are multiple reasons for the delay element 420. First, delay element 420 delays the clear pulse so that flip-flop 401 and flip-flop 402 have a chance to settle before being cleared. Second, delay element 420 supplies a minimum length to the clear pulse. Third, delay element 420 forces an overlap between the charge up and charge down currents, eliminating dead-banding. So when WD_HP+ arrives, the clear operation will start, and the charge down current will be turned on, canceling out the charge up current. The flip/flops (flip-flop 401 and flip-flop 402) then clear and both currents are shut off.

Likewise if WD_HP+ arrives before WD_IN+, the charge down current will be enabled, and arrival of WD_IN+ then shuts it back off. The flip-flop 403 and flip-flop 404 work in exactly the same fashion as flip-flop 401 and flip-flop 402, with the exception of using the opposite polarity of the input signals, and thereby causing the circuit to work on the other transition direction. A second difference regarding flip-flop 403 and flip-flop 40 is the connection of the flip/flop outputs: because the system pulse pairs when a correction is required (if the first transition is early the second transition will be late), the direction of the correction is reversed.

The voltage-to-current converter 244 (see FIG. 5) compares Vcntl to a reference value (Vref), and generates a differential current that is proportional to the difference between these voltages.

In view of the operating speeds required for some tape drives (e.g., a tape drive with a write clock rate on the order of 113 MHz with a timing adjustment range of about +−1 nsec), it would be advantageous to use integrated capacitors for all capacitors. The use of integrated capacitors could also serve to reduce noise (both pickup and transmitted), as well as reduce pin count. The disadvantage of integrated capacitors is the tolerance involved in the absolute value. The relative value to other capacitors on the same die is very good, however. If any precision were desired on the absolute value of the timing, that some provision should be included to calibrate the capacitor value.

One embodiment includes a frequency locked oscillator on the part that controls the value of the timing currents based on a reference clock. The current reference circuit of this embodiment can be common between multiple write channels, however. This circuit also has the advantage of providing a scaling function by changing the reference clock. This will allow the part to be adapted to different data rates by changing the write clock.

Figure 13:
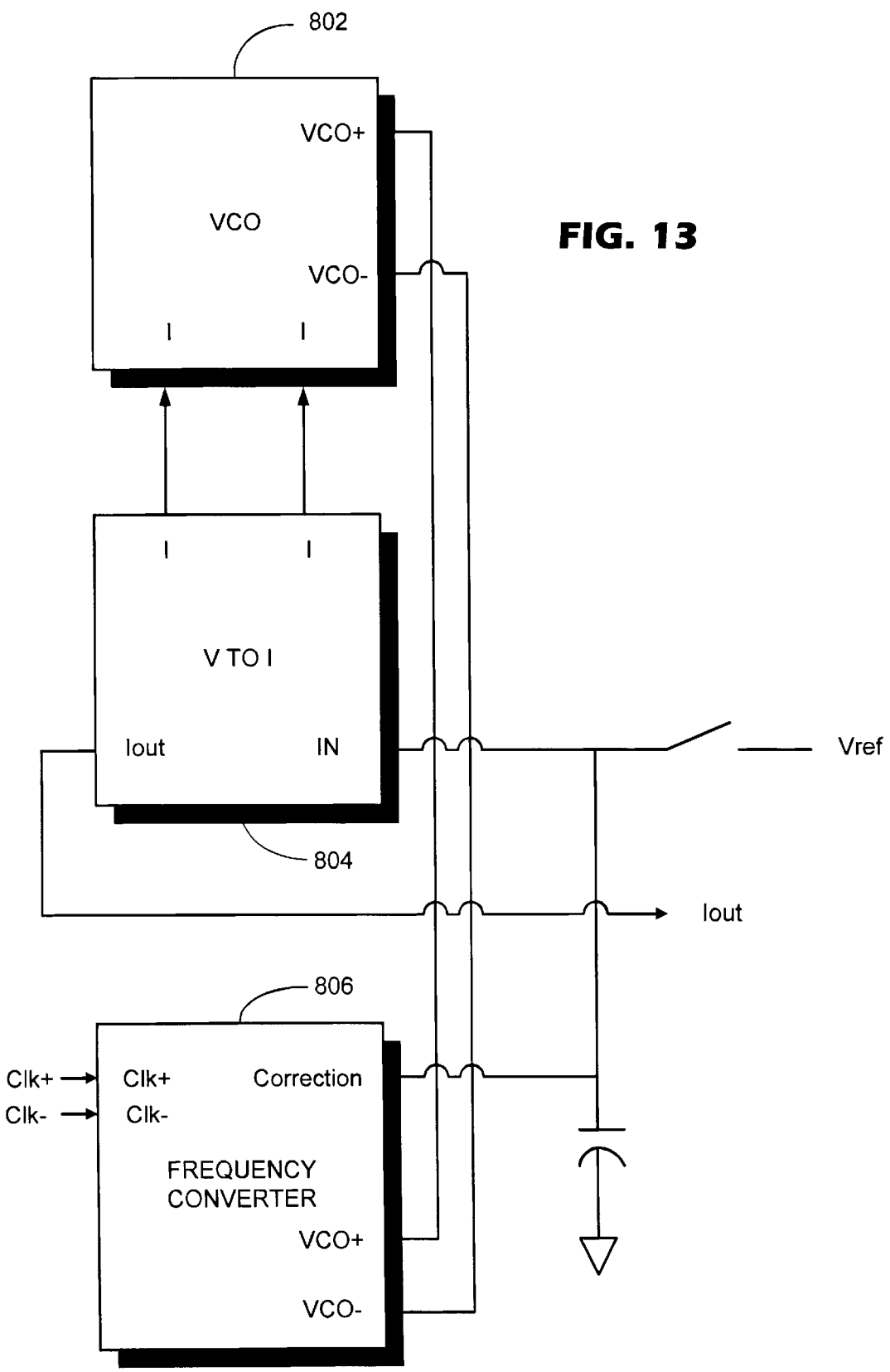
FIG. 13 is a schematic view of a frequency locked loop utilized in conjunction with the present invention.

In the above regard, FIG. 13 shows a frequency locked loop 800 that comprises voltage controlled oscillator VCO 802, a voltage to current converter 804, and a frequency comparator 806. The frequency locked loop 800 uses a reference clock as its input to the frequency comparator 806. The frequency comparator 806 compares the reference clock to an internal VCO signal generated by VCO 802, and uses the difference to adjust the frequency of VCO 802 to be the same as the reference clock. The control current required to set the VCO the same as the reference clock input is then used as a reference (Iout) to the remainder of the write compensator circuit. Since the VCO uses on board capacitors and resistors (likely the same values as used in the write compensator to improve matching), the output current Iout is a function of these components, and the effect of their absolute value will be removed.

The topology of direction dependent delay circuit 302 is similar to a multivibrator circuit. If a similar topology is used for the time base reference, matching of the two circuits will be eased.

The high pass function described earlier (e.g., high pass filter 306 shown in FIG. 3) has the advantage of being simple and easy to understand. However, as noted earlier, the integrated form would have a large number of input/outputs, and could be implemented in a fashion that would significantly reduce the pin count. Accordingly, another implementation of the high pass function is a DC coupled scheme with and includes an output offset adjustment integrator 700 such as that shown in FIG. 7.

Figure 7:
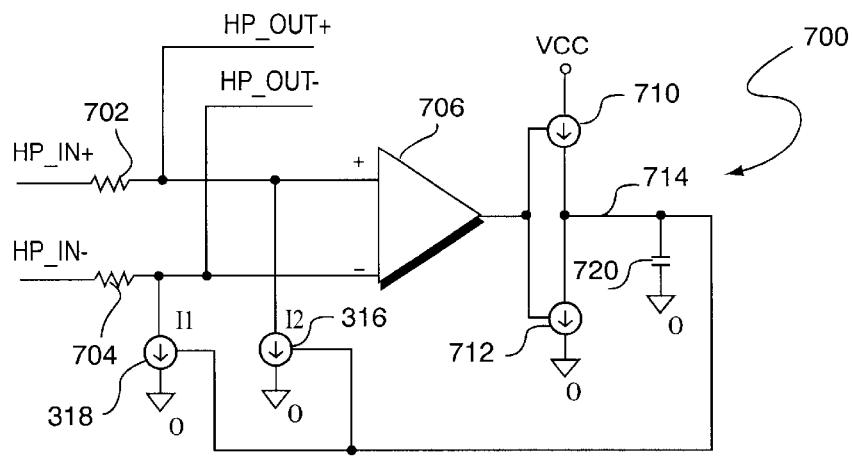
FIG. 7 is a schematic view of an example output offset adjustment integrator for an alternate implementation of a high pass function for the compensation circuit of FIG. 3.

In the output offset adjustment integrator 700 of FIG. 7, the signals HP—IN+ and HP_IN− are the WD_HP+ and WD_HP− signals, respectively, output from comparator 330 of FIG. 3. Moreover, the signals HP_OUT+ and HP_OUT− output from output offset adjustment integrator 700 are the signals applied as inputs to voltage control circuit 242 (i.e., HP_OUT+ is applied to the CLK pin of flip-flop 402; HP_OUT− is applied to the CLK pin of flip-flop 404. Both the signals HP_IN+ (via resistor 702) and HP_OUT+ are connected to the non-inverting input terminal of operational amplifier 706, and through current source 316 to ground. Similarly, both the signals HP_IN− (via resistor 704) and HP_OUT− are connected to the inverting input terminal of operational amplifier 706, and through current source 318 to ground.

The output terminal of operational amplifier 706 is connected to control both current source 710 and current source 712. The current source 710 and current source 712 are connected in series between VCC and ground. The current source 710 supplies a current I3; the current source 712 supplies a current I4. A signal is taken on line 714 from a node between current source 710 and current source 712 and is used as a control signal for both current source 316 and current source 318. The node between current source 710 and current source 712 is also connected via integrating capacitor 720 to ground.

The operation of output offset adjustment integrator 700 of FIG. 7 is now briefly summarized. Again, the sum of current I1 and current I2 is a constant. As the voltage on integrating capacitor 720 increases, the current I2 will increase, and current I1 will decrease. The sum of current I3 and current I4 is also a constant, and like current I1 and current I2, currents I3 and I4 move in opposite directions. A positive voltage on the + input of the operational amplifier 706 results in an increase in current I3, and a decrease in current I4. The advantage of the output offset adjustment integrator 700 of the FIG. 7 embodiment is that the high pass frequency may be easily adjusted. Changing the sum of current I3 and current I4 facilitates this adjustment. The configuration of FIG. 7 also has a second advantage of having only one capacitor, and that capacitor (e.g., integrating capacitor 720) is not in the signal path.

Figure 9:
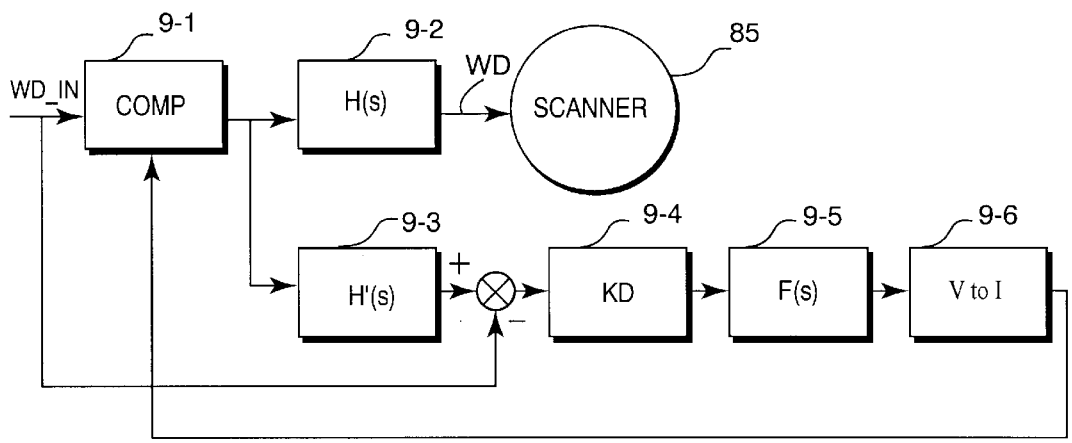
FIG. 9 is a schematic view of a transfer function and control loop employed for the compensation circuit.

The compensation circuit 240 of the present invention has a transfer function and control loop which are depicted by FIG. 9. In FIG. 9, block 9-1 is comparator 300, circuit 302, and comparator 304; block 9-2 is transformer 220; block 9-3 is circuit 306; blocks 9-4 and 9-5 are voltage control circuit 242; and block 9-6 is voltage to current convertor 244. Where blocks 9-4 and 9-5 separate, 9-4 is the value of the current sources 430 and 432, and 9-5 represents the integration capacitor 436. The transformer model is s/s+a, where "s" is shorthand for jT, which in turn is shorthand for 2 Bif, where f is frequency. So the transfer function s/s+a is a high pass filter with the −3 dB point at a. For the situation shown, KD*F(s)=Gain Error Detection*Compensator=Volt/Rad and V to I=Amp/Volt.

As explained previously, the input to this system is the write data (WD_IN). The output is the write data (WD) being applied to the scanner 85. The write data WD on the scanner 85 cannot be observed as it is rotating on scanner 85. Therefore, this design models the write data on scanner 85 using the observable transfer function (H'(s)). The loop then modifies the compensation timing applied in the block 9-1 such that the output from transformer model transfer function [H'(s)], i.e., block 9-3, (and hopefully the output of block 9-2 H(s) if the modeling is accurate) is the same is the input write data WD__IN.

For the above discussed scenario, transfer function capacitor values of 10 pf are used. This value is sized such that it could be integrated. Additional constraints to the calculation are an Fmax of 113 MHz, a maximum run length of 6, a maximum adjustment range of 3 nsec, a transformer high pass of 200 kHz, a charge pump current of 250 uA (used to set the bandwidth), and comparator and charge pump voltage swings of 1 Volt. So "a" in the previous statement is 200 KHz*2*PI. Again these parameters are intended as a starting point and are easy to change.

Figure 10A:
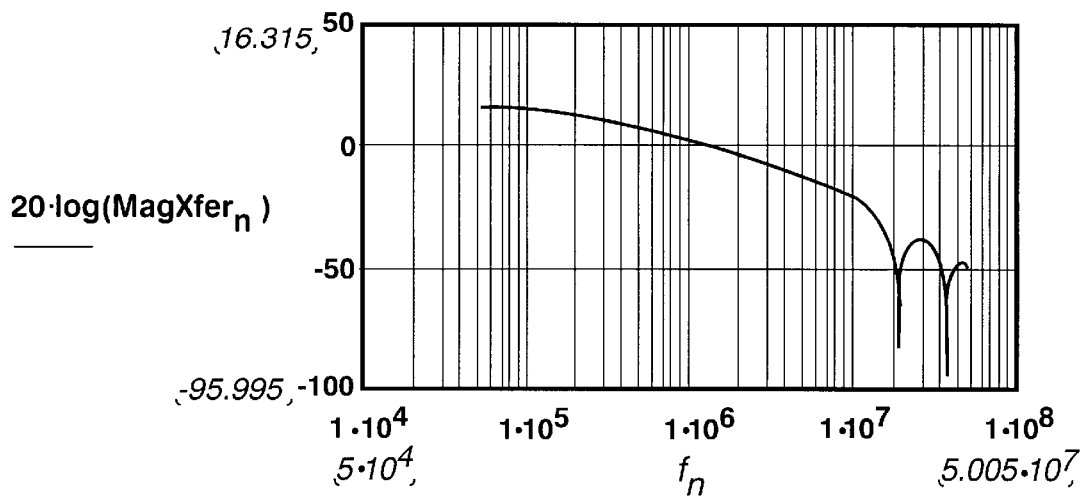
FIG. 10A is a graphical view of the magnitude of an open loop transfer function.
Figure 10B:
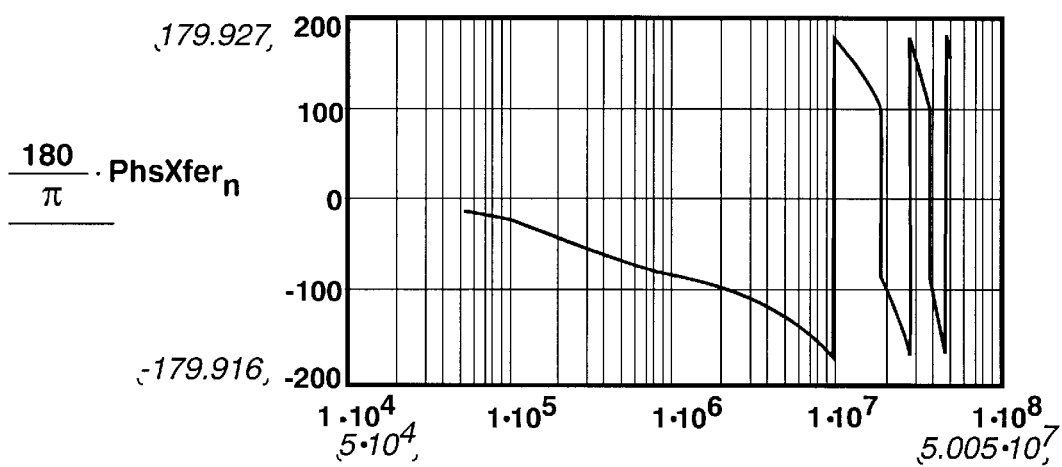
FIG. 10B is a graphical view of a phase plot for the scenario of FIG. 10A.

The open loop transfer function described by FIG. 9 is illustrated in the graph of FIG. 10A. In FIG. 10A, the vertical scale is in dB, the horizontal scale in frequency. FIG. 10B shows a phase plot for the same scenario. FIG. 10A and FIG. 10B detail a system with about a 1.6 MHz bandwidth with 90 degrees of phase margin.

Figure 11A:
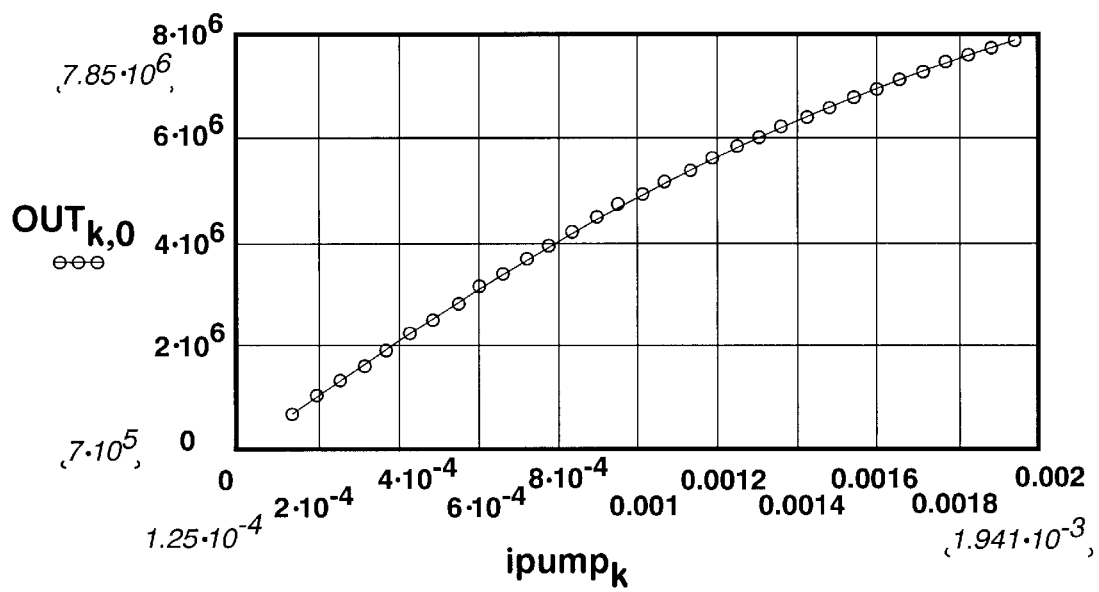
FIG. 11A and FIG. 11B are graphical views in which a charge pump current for the voltage control circuit of FIG. 4 is varied, FIG. 11A showing bandwidths of the open loop transfer function and FIG. 11B showing phase margin of the same transformer function.
Figure 11B:
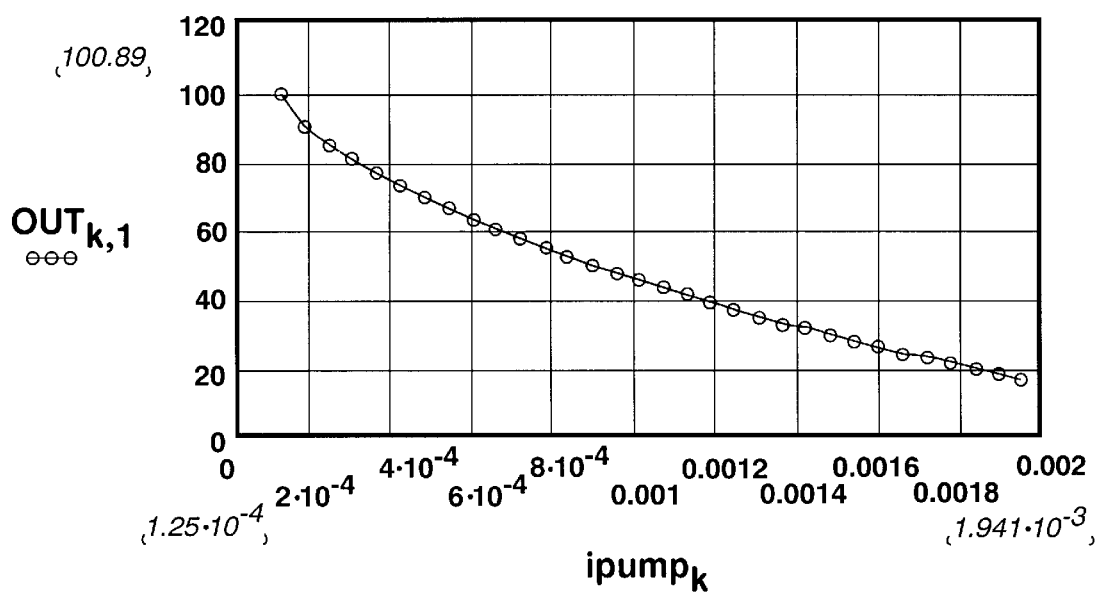

In FIG. 11A and FIG. 11B, the charge pump current is varied and the system bandwidth and phase margin are extracted. In FIG. 11A, the vertical axis is the bandwidth in frequency; the horizontal axis is the charge pump current. In FIG. 11B, the vertical axis is phase margin in degrees; the horizontal axis is the charge pump current. From FIG. 11A and FIG. 11B it would appear as if a charge pump current of 1 mA would result in a phase margin of 45 degrees with a bandwidth of 5 MHz for this system.

The charge pump current magnitude is the magnitude of current sources 430 and 432 in FIG. 4. It should also be noted that FIG. 10A is the bandwidth (in Hz) of the open loop transfer function, that is the 0 dB crossover point as depicted in FIG. 10A, and that FIG. 11B is the phase at the 0 dB crossover point and −180 degrees. These values are of interest because they define the operating speed and stability of the system.

The delay values for delay element 420 and delay element are chosen with two basic criteria. The first criteria is to guarantee a minimum on time for both current source I1 and I2. The way this circuit works is the first clock edge received will turn on either the pump up current (to the positive supply) or the pump down (to the negative supply). The final edge received then turns on the other current source canceling out the first one, so the system appears to have turned the current sources off. The clear on the flip/flops 401–404 then propagates through the system, turning off both current sources I1 and I2. This delay is applied to avoid "deadbanding" the system where no updates are generated if the two edges get too close to each other. The second criteria for this delay is to supply a minimum clear pulse width to the flip/flops 401–404. The exact delay is dependant on the gate delay of the process used to build the device. A delay of 2 to 3 gate delay times tends to work well for this topology.

As mentioned above, the present invention models the transformer high pass function using an RC high pass filter. There is the possibility that an error could exist between the transfer function of the RC high pass filter and the transfer function of the modeled transformer. Any such error can be calibrated out by modifying the compensator high pass (e.g., high pass filter 306) until the error rate is minimized, while using a worst case data pattern. A worst case data pattern would be one that maximizes the DC content. In the case of a 0.6 code it would be a single 1 followed by 6 zeros repeating, or the inverse; a single zero, followed by 6 ones repeating.

As was already noted, values of 10 pF were assumed for the capacitors. The nominal tail current in the direction dependent delay circuit 302 is 333 uA (I1 and I2, or current sources 540 and 542), resistor 524 is 300 Ohms, the compensator current 250 uA (current source 430,432). For the high pass stage 700, capacitor 720 was 10 pF, resistors 702 and 704 were assumed to be 1 Kohm, and the gain of the combination of amplifier 706 and current sources 710 and 712 was 14 uAmps per volt.

This present invention, in conjunction with the power on the scanner (e.g., rotor), allows a read channel code to contain DC information. The advantage of allowing DC content is that the maximum amount of data that can be recorded is increased for a given head/tape combination. This is because codes that are not constrained to be DC free have higher efficiencies (on the order of 15% higher efficiency) than those that are so constrained.

Power on the rotor is required because a write driver is required on the rotor side of the transformer. The waveform transferred across the transformer must be in the form of a voltage.

Figure 12A:
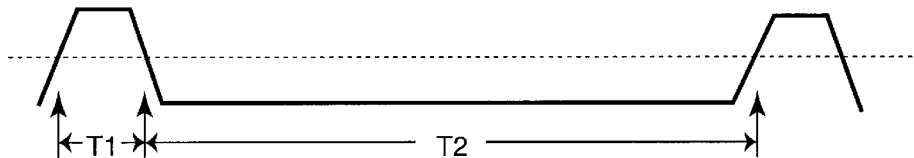
FIG. 12A and FIG. 12B are graphical views illustrating problems attending the use of a DC code in a transformer-coupled tape drive system.
Figure 12B:
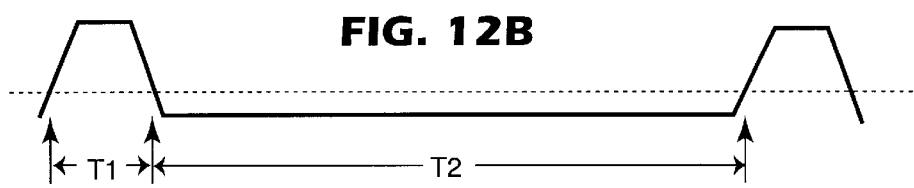

Previously it was mentioned, with reference to FIG. 12A and FIG. 12B, that much more current may be used to write in the upward direction than the down going direction. If this difference is high enough, the head may be saturated in the up going direction, and may not be able to overwrite the old data in the downward one. In the present invention, this issue is addressed by the way in which power is supplied and handled on scanner 85. In particular, an additional write current switch is employed on scanner 85 as write drive 83. This switch reverses the direction of the write current at each zero crossing of the write voltage waveform, solving the difficulty of asymmetric write currents.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tape drive which transduces information relative to magnetic tape, the tape driving comprising:
    an encoding unit for encoding data to be recorded with a direct current (DC) content code and which generates a write data signal for DC-code encoded data;
    a compensation circuit connected to receive the write data signal from the encoding unit and output a compensated write data signal which is corrected for timing distortion caused by the DC content code;
    a transformer connected to receive the compensated write data signal and to output a transformed write data signal;
    a write head which records information on the magnetic tape in accordance with the transformed write data signal; and
    wherein the compensation circuit comprises:
        a circuit which emulates a high pass filter action of the transformer to provide an emulated high pass filter response signal;
        a delay circuit which modifies timing of the write data signal in accordance with the emulated high pass filter response signal to output the compensated write data signal.

2. The apparatus of claim 1, wherein the transformer is a high pass transformer.

3. The apparatus of claim 1, further including a write amplifier connected between the transformer and the write head.

4. The apparatus of claim 1, wherein the write head is mounted on a rotating scanner of a helical scan tape drive.

5. The apparatus of claim 1, wherein the compensation circuit includes a first comparator having first and second output terminals and a second comparator, the second comparator having a first input terminal and a second input terminal, the second comparator having its output connected to the transformer, and wherein the delay circuit comprises:
- a first transistor connected as an emitter follower to the first output terminal of the first comparator, a terminal of the first transistor being connected to the first input terminal of the second comparator and to ground through a first current source;
- a second transistor connected as an emitter follower to the second output terminal of the first comparator, a terminal of the second transistor being connected to the second input terminal of the second comparator and to ground through a second current source; and
- wherein a magnitude of a first current $I1$ generated by the first current source and the a magnitude of a second current $I2$ generated by the second current source are controlled by the emulated high pass filter response signal.

6. The apparatus of claim 5, wherein the magnitude of a first current $I1$ and the magnitude of the second current $I2$ are controlled whereby a sum of the magnitude of a first current $I1$ and the magnitude of the second current $I2$ is a constant.

7. The apparatus of claim 5, further comprising:
- a voltage control circuit connected to receive the emulated high pass filter response signal and which generates a voltage control signal;
- a voltage to current converter which controls the relative magnitudes of the first current $I1$ and the second current $I2$ in accordance with the voltage control signal.

8. A method of operating a tape drive which transduces information relative to magnetic tape, the method comprising:
- encoding data to be recorded with a direct current (DC) content code and generating a write data signal for DC-code encoded data;
- correcting distortion in the write data signal caused by the DC content code and outputting a compensated write data signal in accordance therewith;
- applying the compensated write data signal to a transformer which outputs a transformed write data signal;
- recording information on the magnetic tape in accordance with the transformed write data signal; and
- wherein the correcting step comprises:
  - using a circuit to emulate a high pass filter action of the transformer to provide an emulated high pass filter response signal;
  - modifying timing of the write data signal in accordance with the emulated high pass filter response signal to output the compensated write data signal.

9. The method of claim 8, further comprising using a write amplifier connected between the transformer and the write head to feed the write head.

10. The method of claim 8, wherein the tape drive is a helical scan tape drive, and further comprising rotating a rotating scanner of a helical scan tape drive upon which the write head is mounted.

* * * * *